United States Patent [19]

Cheney et al.

[11] 3,881,911

[45] May 6, 1975

[54] FREE FLOWING, SINTERED, REFRACTORY AGGLOMERATES

[75] Inventors: Richard F. Cheney, Towanda; David J. Port, Athens; James R. Spencer, Sayre, all of Pa.

[73] Assignee: GTE Sylvania Incorporated, Stamford, Conn.

[22] Filed: Nov. 1, 1973

[21] Appl. No.: 411,663

[52] U.S. Cl. .................. 75/.5 BB; 75/.5 BC; 106/1; 106/43; 106/55
[51] Int. Cl....... C22c 1/04; C22c 1/05; C04b 35/52; C04b 35/58
[58] Field of Search......... 75/211, .5 R, .5 B, .5 BA, 75/.5 BB, .5 BC; 117/105.2

[56] References Cited
UNITED STATES PATENTS

| | | | |
|---|---|---|---|
| 2,179,960 | 11/1939 | Schwarzkopf | 75/213 X |
| 2,857,270 | 10/1958 | Brundin | 75/213 |
| 3,395,030 | 7/1968 | Dittrich | 117/105.2 X |
| 3,397,057 | 8/1968 | Harrington | 75/.5 R X |
| 3,473,915 | 10/1969 | Pierret | 75/211 X |
| 3,617,358 | 11/1971 | Dittrich | 117/93.1 X |

*Primary Examiner*—L. Dewayne Rutledge
*Assistant Examiner*—Arthur J. Steiner
*Attorney, Agent, or Firm*—Norman J. O'Malley; John C. Fox; Donald R. Castle

[57] ABSTRACT

Free flowing powders for flame spray applications are produced by; spray drying a slurry of finely-divided particulates of a refractory material and binder under conditions to obtain particle agglomerates at least five times the diameter of the subparticles, presintering the agglomerates to remove the binder, and sintering together the subparticles to cause strengthening of the agglomerates. Screening to obtain a desired size distribution may take place either before or after sintering.

4 Claims, 2 Drawing Figures

FREE FLOWING, SINTERED, REFRACTORY AGGLOMERATES

BACKGROUND OF THE INVENTION

This invention relates to an improved method for producing free-flowing refractory powders from finely-divided particulate material for flame spray applications and to the resultant product.

Metallic and ceramic flame-spray coatings are frequently applied to various articles to impart properties such as hardness, wear resistance, good lubricity, corrosion resistance, improved electrical properties or perhaps simply to build up a used part which has worn below usable tolerances. For the refractory materials, such as Mo, W and WC, flame spraying may be the only practical way of forming such coatings.

The coatings are applied by passing either a wire or powder through a flame thereby forming molten droplets which are entrained in the hot combustion gases and propelled against the surface of the object being coated. At the present time wires are commonly used to produce metal flame spray coatings, usually in conjunction with an oxyacetylene flame. However, metal powders are becoming more popular because of a greater range of potential compositions than wire plus the potential for lower cost when produced in amounts equivalent to wire. The recent availability of improved powder feeder equipment and improved plasma flame guns has accelerated the shift to powders.

Powders for flame spraying are desireably uniform in size and composition, and relatively free flowing. Narrow size distribution is important because, for example, under set flame conditions, the largest particles may not melt completely and the smallest particles may be heated to the vaporization point. Incomplete melting obviously is detrimental to coating uniformity and vaporization decreases coating efficiency.

Powders for flame spraying have been made by atomizing molten metal and by granulating solids to an appropriate size range. Granulation is here considered to include both comminution and agglomeration to arrive at a desired size product. Whether made by atomization or granulation, the final powder size is achieved by classification methods such as screening or fluid sedimentation. Typically, the size ranges are held such that 80% of the particles fall within a 30 μm diameter range. The range for all particles might be 60 μm. Flowability must be sufficient for the powders to be uniformly transported to and injected into the flame.

The ceramics and powder metallurgy industry have used various agglomeration methods in order to make free flowing powders of normally non-flowing small-diameter powder particles, usually involving use of an organic binder to promote formation of the agglomerates. Because of their larger size and relatively lower surface area the agglomerates have improved flow properties.

One of the more sophisticated agglomeration methods used for some time in the pharmaceutical and food industries utilizes spray drying. Agglomerates are formed in spray drying by slurrying the powder with the binder and then atomizing the slurry into the drying chamber. The result is a generally spherical agglomerate held together by the binder.

As might be expected, spray drying methods have been attempted in the ceramics and metallurgical fields, for example, in the production of flame spray powders. See U.S. Pat. No. 3,617,358, issued to F. J. Dittrich on Nov. 2, 1971. While such procedures do provide agglomerated, free flowing powders, they have some attendant difficulties. For example, in the flame, the binder may react with the powder; it may stay as a gas being noticeable and sometimes objectionable as a smoke, or it may condense outside the gun, plugging the nozzle or fouling the work piece or work area.

Another deficiency, for flame spray powder use, is the typically low strength of the agglomerates. This is due to the fact that flame spray powders must withstand considerable handling during classification after spray drying, during blending and while being transported through the powder-feeder screw and when forced into the nozzle of the plasma gun. During such handling the binder is usually not strong enough to prevent some breakdown and loss of flow and coating properties.

A third problem with spray dried powders is low apparent density. The binder material occupies space which powder would otherwise occupy. Thus fewer pounds of powder can be fed to a plasma gun in a given period of time.

SUMMARY OF THE INVENTION

In accordance with the invention, it has been found that the binder related deficiencies of contamination, low apparent density and low agglomerate strength can be overcome by heating the agglomerates above the vaporization temperature of the binder to remove the binder and thereafter heating the powders to a still higher temperature causing the subparticles of the agglomerates to sinter or fuse together by diffusion bonding. This second temperature must not exceed ½ of the melting point of the material since that would result in the agglomerates themselves sintering or fusing together to form an unusable cake or sponge. The sintering of the subparticles restores or improves the strength which the agglomerates had prior to removal of the binder, and also causes a densification of the agglomerates, thus improving the apparent density. By controlling this sintering within the permissible range, the apparent density can be intentionally adjusted over a considerable range.

For successful strengthening of the agglomerates, it is also necessary to control the relative sizes of the subparticles of the agglomerates. In general, these subparticles should be no larger than 1/5th the agglomerate diameter and generally 1/10th or less. This is important because if the subparticles are too large, heating under the conditions necessary to avoid appreciable sintering of the agglomerates will result in agglomerate strengths insufficient to permit handling after the sintering operation. Accordingly, the subparticles should preferably be as small as possible, e.g., 1/100 the agglomerate diameter or less.

For particles within the above size range, sintering results in a product which is a free flowing binderless powder having sufficient strength to withstand considerable handling, and being useful in flame spraying applications.

Where size classification of the product is desired, it may be carried out at any stage of the processing found to be convenient.

DETAILED DESCRIPTION OF THE INVENTION

Figure 1:
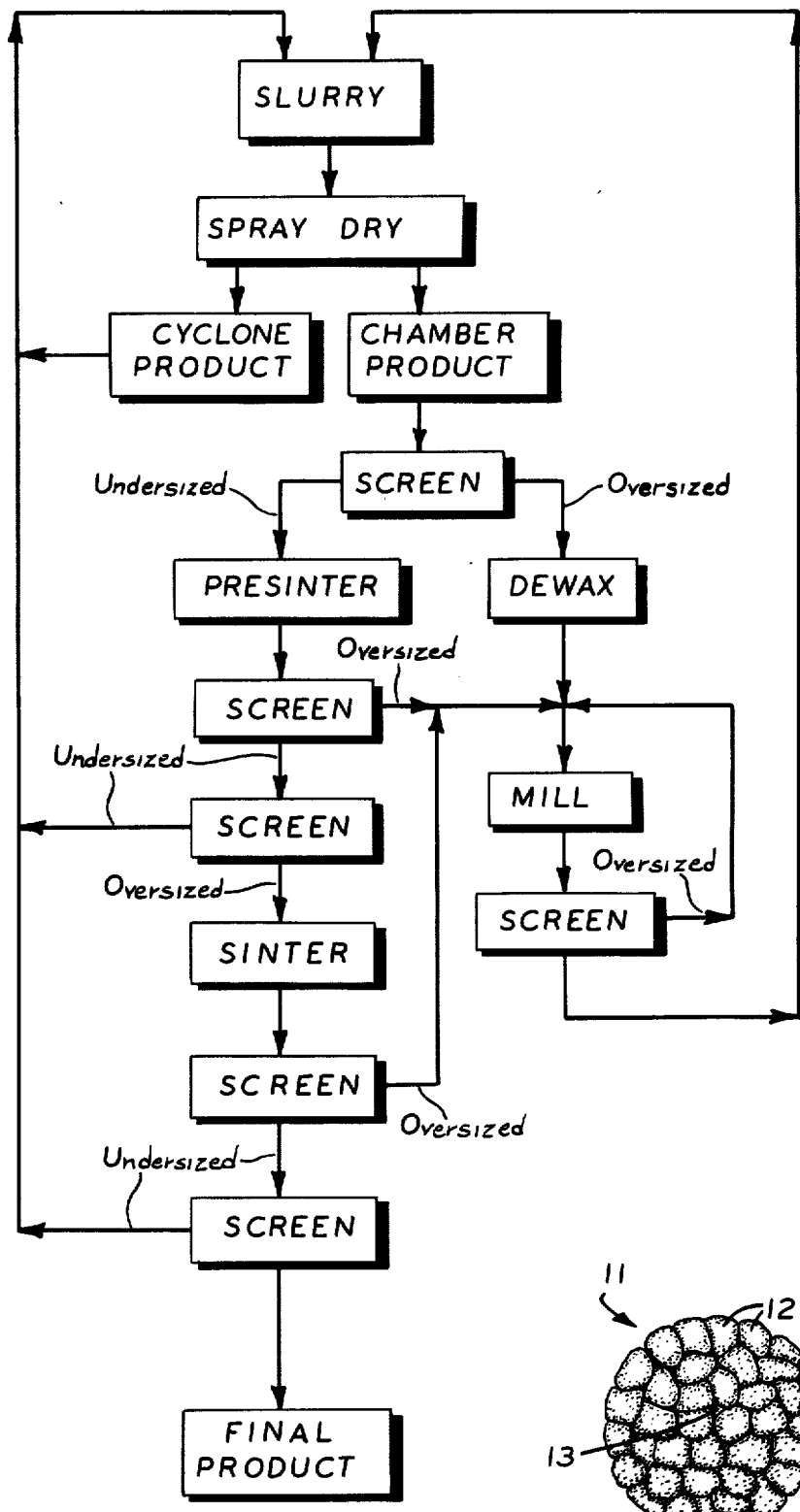
FIG. 1 is a block flow diagram of one embodiment of the process of the invention, suitable for commercial production of free flowing flame spray powders of controlled size distribution, in which out of size material is continually reprocessed.
Figure 2:
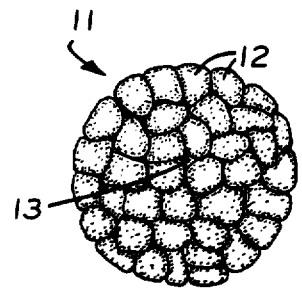
FIG. 2 is a representation of a typical particle agglomerate of the invention.

The invention is practiced with inorganic materials having a melting point above 1,800°C, including the refractory metals W, Mo, Cr, Ta and Nb and their alloys, refractory oxides, and any of the borides, carbides and nitrides with or without any of various modifying additives known or used commercially to enhance one or more properties of these materials. Exemplary of such modified materials are the cemented tungsten carbides containing up to 30 percent Co. Normally, it is desired to increase particle size in order to improve flowability, and for this purpose powders having particle sizes in general below about 30 $\mu$m will require agglomeration.

Agglomeration may be by any suitable technique known and practiced in the art, such as spray drying a slurry of the powder and binder, or admixing powder and binder in the presence of moisture. As already mentioned, such agglomeration must be carried out under conditions to achieve agglomerates at least five and preferably ten or more times the diameter of the subparticles. The influence on agglomerate size of such factors as starting particle size, type and amount of binder, solids content of the slurry, spray drying temperatures, etc., are either well known or readily determinable by experimentation and thus a detailed description of agglomeration techniques is unnecessary to the practice of the invention. Agglomeration by spray drying is in general preferred in that it usually yields a product having a narrower particle size range than do other agglomeration techniques, and thus permit less classification to obtain finished product. A description of spray drying may be found, for example, in U.S. Pat. No. 3,617,358 issued to F. J. Dittrich on Nov. 2, 1971 and U.S. Pat. No. 3,373,119 issued to C. W. Krystyniak on Mar. 12, 1968.

The particular binder or binder system employed must be stable at the temperatures at which agglomeration is carried out, but must be removed by volatilization prior to sintering in order to avoid any binder or binder decomposition product contamination during sintering. Thus, the binder should volatilize at about 50°C above the highest temperature to which the material is subjected during agglomeration, and at least 50°C below the lowest temperature at which sintering is carried out. These requirements permit the use of the technique with a large proportion of the commonly used binders, such as polyvinyl alcohol, stearic acid, paraffins, polyethylene glycol, methyl cellulose, and various resins.

The process will now be described in terms of a preferred embodiment including certain optional steps and suitable for use in the commercial production of free flowing flame spray powders of controlled size distribution. With reference to the figure, which is a block flow diagram of the process, starting material is mixed with liquid and binder to form a slurry, and the slurry is spray dried in a conventional spray drying apparatus to obtain agglomerates. Unagglomerated material, the socalled cyclone product, is recycled by adding to it subsequent slurries. The agglomerated material, or chamber product, is classified by screening through a coarse screen, e.g., a 20 mesh screen. (All screen sizes herein are Standard U.S. Sieve or equivalent, unless otherwise designated.) The oversized material, e.g., +20 mesh, which may include coarse scrapings from the sides of the drying chamber, is dewaxed, i.e., heated to at least partially remove binder, and then deagglomerated by milling and screened through a finer screen, e.g., 200 mesh. The undersized fraction is recycled to slurry, while the oversized fraction is remilled. The undersized, e.g., −20 mesh fraction of the chamber product is presintered to remove the binder, and screened through two progressively finer screens, e.g., 200 mesh and 325 mesh. The +200 mesh fraction is milled and recycled as above and the −325 mesh fraction is recycled with the cyclone fines. The −200, +325 mesh fraction is then sintered to strengthen and densify the binderless agglomerates, and the resultant product is again screened 200 mesh and 325 mesh. Out-of-size material is again recycled, while the −200, +325 mesh material represents finished product.

Some representative Examples are now presented to aid the practitioner.

EXAMPLE I

A molybdenum flame spray powder is manufactured as follows. A slurry is made by dissolving 1.5% (wt.% solids basis) polyvinyl alcohol in hot water and adding (FSSS) 3–6 $\mu$m Mo powder to a 60–70%, preferably 70%, solids concentration. The slurry is pumped at low pressure to a two fluid nozzle located at the top of a commercially available spray dryer. The slurry is continually agitated throughout the spray drying run. The atomization air pressure to the nozzle is 40–60 psi. The inlet air temperature is 370°–430°C, preferably 400°C, with an outlet temperature of 140°–150°C, preferably 150°C on the drying air passing through the dryer at 20–30 cfm.

The product from the spray dryer first receives a presintering cycle of 4 hours at 600°C in a hydrogen atmosphere to remove binder. The powder is then sintered for 4½ hours at 1,100°C in $H_2$. This sintering gives the powder enough granule strength to withstand classification, handling during shipping and feeding to the flame spray gun.

The sintered powder is separated into the desired size fractions for plasma flame spraying by screening. A typical size distribution obtained is:

| | |
|---|---|
| 1% max. | +170 mesh |
| 15% max. | +200 mesh |
| 80% min. | −200 + 325 mesh (44 to 74 microns) |
| 20% max. | −325 mesh |

The out of size material is deagglomerated by milling and screened 200 mesh. The −200 mesh fraction is used along with virgin powder in subsequent slurries for spray drying while the +200 mesh fraction is returned to the mill.

EXAMPLE II

A cemented tungsten carbide flame spray powder is manufactured as follows. The powder is prepared by ball milling a blend of WC powder from 0.5 to 4.0 $\mu$m FSSS with Co powder from 1 to 10 $\mu$m FSSS to produce a powder of composition WC-12 percent Co. The slurry is prepared by combining this powder, paraffin wax and stearic acid in the relationship of 97.6:2:0.4 respectively, with enough trichloroethane to make an 80–85% solids concentration. Spray drying is carried out as in Example I with the following exceptions. The drying conditions are 120°–125°C inlet air temperature, 65°–70°C outlet temperature. The slurry is pumped to the nozzle at low pressure with 38 psi atomization air pressure in the two fluid nozzle. The spray dried powder is composed of very soft agglomerates of wide size distribution. This material is presintered to remove binder in $H_2$ for 4½ hours through a temperature gradient of 500°C–700°C. The powder is then sintered in $H_2$ for 15 minutes at 1,240°C resulting in sufficiently hard granules to withstand screening and handling.

The typical size distribution desired of this powder is 100%, −325 mesh +10 μm. The out of size material is deagglomerated by milling to return it to a particle size which could be used as starting material.

While there has been shown and described what are at present considered the preferred embodiments of the invention, it will be obvious to those skilled in the art that various changes and modifications may be made therein without departing from the scope of the invention as defined by the appended claims.

What is claimed is:

1. A free flowing flame spray powder consisting essentially of particle agglomerates, characterized in that the agglomerates consist essentially of subparticles of at least one inorganic material having a melting point above 1,800°C, the inorganic material selected from the group consisting of the refractory metals W, Mo, Cr, Ta, Nb, their alloys, and the oxide, boride, carbide and nitride compounds of these refractory metals, the subparticles held together by diffusion bonds to one another and having diameters up to 1/5 the diameters of the agglomerates, and at least 80% of the agglomerates having sizes within a range of 30 microns.

2. The powder of claim 1 in which the subparticle diameters are up to 1/10 the diameters of the agglomerates.

3. The powder of claim 1 in which the material consists essentially of molybdenum.

4. The powder of claim 1 in which the material consists essentially of a cemented tungsten carbide.

* * * * *